(12) United States Patent
Aoyama et al.

(10) Patent No.: US 10,482,297 B2
(45) Date of Patent: Nov. 19, 2019

(54) ELECTRONIC DEVICE

(71) Applicant: PANASONIC INTELLECTUAL PROPERTY MANAGEMENT CO., LTD., Osaka (JP)

(72) Inventors: Shinya Aoyama, Kanagawa (JP); Shinji Tomobe, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/251,498

(22) Filed: Jan. 18, 2019

(65) Prior Publication Data

US 2019/0266370 A1 Aug. 29, 2019

(30) Foreign Application Priority Data

Feb. 23, 2018 (JP) .................................. 2018-030660

(51) Int. Cl.
*G06K 7/10* (2006.01)

(52) U.S. Cl.
CPC ....... *G06K 7/10891* (2013.01); *G06K 7/1098* (2013.01)

(58) Field of Classification Search
CPC .................................. G06K 9/22; G06K 7/102
USPC ............................... 235/472.01, 462.45, 375
See application file for complete search history.

(56) References Cited

U.S. PATENT DOCUMENTS

| | | | |
|---|---|---|---|
| 2009/0219677 A1* | 9/2009 | Mori ......................... | A45F 3/14 361/679.03 |
| 2010/0258602 A1* | 10/2010 | Amin ..................... | A45C 13/30 224/275 |
| 2013/0082471 A1* | 4/2013 | Castorano ............. | G06F 1/1656 294/25 |
| 2014/0049060 A1* | 2/2014 | Rayner ..................... | A45F 5/10 294/25 |
| 2014/0125076 A1* | 5/2014 | Soffer .................. | H04B 1/3833 294/149 |
| 2015/0257288 A1* | 9/2015 | Livernois ............... | F16M 11/38 248/346.06 |

FOREIGN PATENT DOCUMENTS

| | | |
|---|---|---|
| JP | 04-086966 | 7/1992 |
| JP | 2007-109047 | 4/2007 |
| JP | 2013-050807 | 3/2013 |
| JP | 2015-172983 | 10/2015 |
| JP | 2015-172984 | 10/2015 |
| JP | 2016-136334 | 7/2016 |

* cited by examiner

*Primary Examiner* — Edwyn Labaze

(74) *Attorney, Agent, or Firm* — Greenblum & Bernstein, P.L.C.

(57) ABSTRACT

An electronic device includes an electronic device body and a strap. A protruding portion protruding in a direction of thickness of the electronic device body is provided on a back surface of the electronic device body. The protruding portion is formed on the back surface so as to extend in a direction of a length of the electronic device body. The strap has belt-like two-folded form and is attached on the protruding portion at a position on or vicinity of a gravity center of the electronic device body. A closed open surface of the strap is defined in the direction of the length of the electronic device body and in a direction substantially orthogonal to the back surface. The open surface has an area where a plurality of fingers of an operator are insertable.

9 Claims, 5 Drawing Sheets

ELECTRONIC DEVICE

CROSS REFERENCE TO RELATED APPLICATIONS

This application is based on Japanese Patent Application (No. 2018-030660) filed on Feb. 23, 2018, the contents of which are incorporated herein by reference.

BACKGROUND OF THE INVENTION

1. Field of the Invention

The present disclosure relates to an electronic device provided with a strap.

2. Description of the Related Art

It is known that in the logistics industry, package management and the like are performed with a terminal having a bar code function at a delivery office or by a deliverer himself/herself (see JP-A-2015-172983 and JP-A-2015-172984).

JP-A-2015-172983 and JP-A-2015-172984 are each an optical reading device that reads symbols such as bar codes and two-dimensional codes which device can avoid thickening while attaining further miniaturization by reducing the overall length of the handy terminal, and disclose that reduction in easiness to grip can be prevented even if incorporation of a cylindrical secondary battery cell in the grip portion increases the thickness of this portion.

However, when bar code reading is performed with the optical reading device of JP-A-2015-172983 or JP-A-2015-172984 while a package is being conveyed, it is necessary to place or house the optical reading device on the workbench or in a holster worn by the deliverer each time, so that the working efficiency does not increase.

SUMMARY OF THE INVENTION

An object of the present disclosure is to provide an electronic device that can be stably held and operated with a strap.

An electronic device of the present disclosure is provided with:
an electronic device body; and
a strap attached to the electronic device body,
wherein a protruding portion protruding in a direction of thickness of the electronic device body is provided on a back surface of the electronic device body;
wherein the protruding portion is formed on the back surface so as to extend in a direction of a length of the electronic device body;
wherein the strap has belt-like two-folded form and is attached on the protruding portion at a position on or vicinity of a gravity center of the electronic device body;
wherein the strap has a closed open surface and the strap is attached to the electronic device body so that the closed open surface is defined in the direction of the length of the electronic device body and in a direction substantially orthogonal to the back surface; and
wherein the open surface has an area where a plurality of fingers of an operator are insertable.

According to the present disclosure, since a space where a plurality of fingers other than the thumb of the operator are insertable is defined in the open surface of the strap, the electronic device can be grasped with the fingers and the palm and is stabilized in the hand, so that the operation of the display portion can be easily performed with the thumb. Moreover, since the protruding portion is formed on the back surface so as to extend in the direction of the length of the electronic device body, when the operator holds the electronic device on his/her palm, it is easy to freely move the thumb by placing finger tips on the protruding portion, so that the display portion is easily operated with one hand even if the electronic device is increased in size. Since the strap is attached to on or the vicinity of the gravity center of the electronic device body, even if a package is carried with fingers being inserted in the strap, the electronic device is stabilized and the electronic device is easily rotated with the attachment position as the center of rotation. In particular, since the open surface is formed in the direction substantially orthogonal to the back surface, the electronic device can be rotated with the finger inserted in the width direction, and by rotating the electronic device with the length direction thereof as the vertical direction, a centrifugal force is easily produced, so that the rotation operation is facilitated.

BRIEF DESCRIPTION OF THE DRAWINGS

FIG. 1A is a front perspective view and FIG. 1B is a back perspective view.

DETAILED DESCRIPTION OF THE EXEMPLARY EMBODIMENTS

Figure 1A:
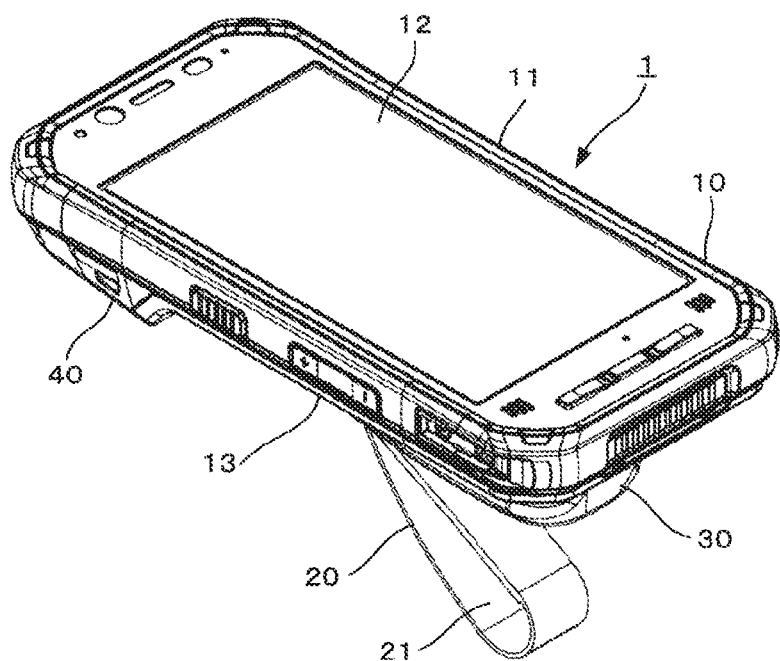
FIGS. 1A and 1B show an example of an electronic device of the present disclosure.

Hereinafter, referring to the drawings as appropriate, an embodiment (hereinafter, referred to as "present embodiment") concretely disclosing an electronic device according to the present disclosure will be described in detail. It is to be noted that there are cases where an over-detailed description is omitted. For example, there are cases where a detailed description of an already well-known item and an overlapping description of substantially the same components are omitted. This is in order to avoid the following description from being unnecessarily redundant and facilitate understanding of one of ordinary skill in the art. The attached drawings and the following description are provided in order for one of ordinary skill in the art to sufficiently understand the present disclosure, and it is not intended to limit the subject matter described in claims by these.

Hereinafter, an exemplary embodiment for carrying out the present disclosure will be described in detail with reference to the drawings.

Figure 1B:
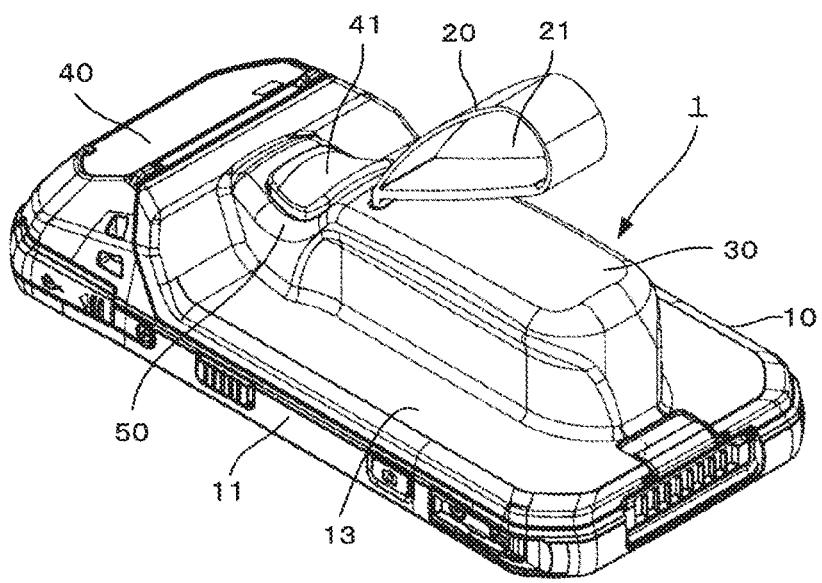

FIGS. 1A and 1B show an example of an electronic device of the present disclosure; FIG. 1A is a front perspective view and FIG. 1B is a back perspective view. Based on FIG. 1, the electronic device of the present disclosure will be described in detail.

The electronic device 1, which includes one for personal use and one for business use, is a portable telephone such as a smartphone, a portable terminal such as a tablet, a digital camera, a portable personal computer, a radio or the like, and is provided with an electronic device body 10 and a belt-like and deformable strap 20 attached to the electronic device body 10 and made of skin or cloth. For the electronic device 1 of the present embodiment, the following is shown as an example: a mobile communication type portable terminal device that has shock resistance, vibration resistance, drip-proofness, dust-proofness and the like, is used at commercial sites of factories, construction, public safety, carriers and the like and is weighty compared with general portable telephones.

On the electronic device body 10, there are disposed a substantially rectangular parallelepiped housing 11 made mainly of resin and a display portion 12 formed of a display such as a liquid crystal panel or an organic EL panel on the front side of the housing 11. A non-illustrated battery is accommodated on a back surface 13 of the housing 11. The display portion 12 has a touch panel which is substantially square in plan view, displays icons, images, information data and the like, and is provided with an operable display function of a UI (user interface) type. On the front side of the housing 11, an operation portion, a speaker, a camera and the like are disposed, and on the side surfaces, side switches, connectors and the like are disposed.

On the back surface 13 of the electronic device body 10, a protruding portion 30 is provided that is formed so as to protrude in the direction of the thickness of the electronic device body 10 and extend in the direction of the length thereof, and the strap 20 is attached in a position on the protruding portion 30 and in the neighborhood of the gravity center of the electronic device body 10. The strap 20 has a two-folded form closed at the position where it is attached, and has a closed open surface 21 defined in the direction of the length of the electronic device body 10 and in a direction substantially orthogonal to the back surface 13. The open surface 21 has an area where a plurality of fingers of the operator are insertable.

On the back surface 13 of the electronic device body 10, a bar code reader 40 is provided, and further, in a position between the attachment position of the strap 20 and the bar code reader 40 on the protruding portion 30, a switch 41 of the bar code reader 40 is provided that is disposed so as to lie over both side surfaces and upper surface of the protruding portion 30. The protruding portion 30 is provided with a depression 50 recessed toward a front surface of the electronic device body 10, and the switch 41 is provided on the depression 50.

When the electronic device 1 is operated with one hand, it is typical to place the palm on the back surface 13 of the electronic device body 10, hold a side surface of the housing 11 of the electronic device body 10 with the tips of the fingers other than the thumb and perform scrolling, tapping and the like on the screen while touching the display portion 12 with the surface of the thumb. However, recent electronic devices are large in size, and electronic devices for industrial uses and the like are large in size and somewhat weighty, so that the conventional way of holding with a hand is unstable and it is difficult for the tip of the thumb to reach the entire area of the display portion.

Since to the electronic device 1 of the present disclosure, the strap 20 is attached and on the back surface 13 of the electronic device body 10, a space where a plurality of fingers other than the thumb are insertable is defined in the open surface 21 of the strap 20, the electronic device 1 can be grasped with the fingers and the palm and is stabilized in the hand, so that the operation of the display portion 12 can be easily performed with the thumb.

Moreover, since the protruding portion 30 is formed on the back surface 13 the electronic device body 10 so as to extend in the direction of the length of the electronic device body 10, when the operator holds the electronic device 1 on his/her palm, it is easy to freely move the thumb by placing finger tips on the protruding portion 30, so that the display portion 12 such as a touch panel is easily operated with one hand even if the electronic device 1 is increased in size.

Since the strap 20 is attached to the neighborhood of the gravity center of the electronic device body 10, the electronic device 1 is stable even if a package 100 is carried with fingers being placed in the strap 20. That is, in a case where the package 100 is carried, when the electronic device 1 is separated from the hand with a plurality of fingers being inserted in the open surface 21 of the strap 20, the electronic device 1 hangs from the fingers through the strap 20 and the palm and fingers become free, so that the package 100 can be carried without the electronic device 1 being released. Since the strap 20 is attached to the neighborhood of the gravity center including the gravity center of the electronic device 1 of the electronic device 1, even if work is performed with the electronic device 1 being hung, the electronic device 1 can maintain a stable posture, so that the electronic device 1 can be prevented from being carelessly bumped against the workbench or the like during work.

FIGS. 2 to 5 are schematic views explaining an operation where the operator (worker) carries the package 100 while holding the electronic device 1 and reads a bar code 110. Using FIGS. 2 to 5, an example of use of the electronic device 1 will be described. While the operator's hand is designated as 200 and the operator's fingers, as 210 in FIGS. 2 to 5, these are omitted in the description.

Figure 2:
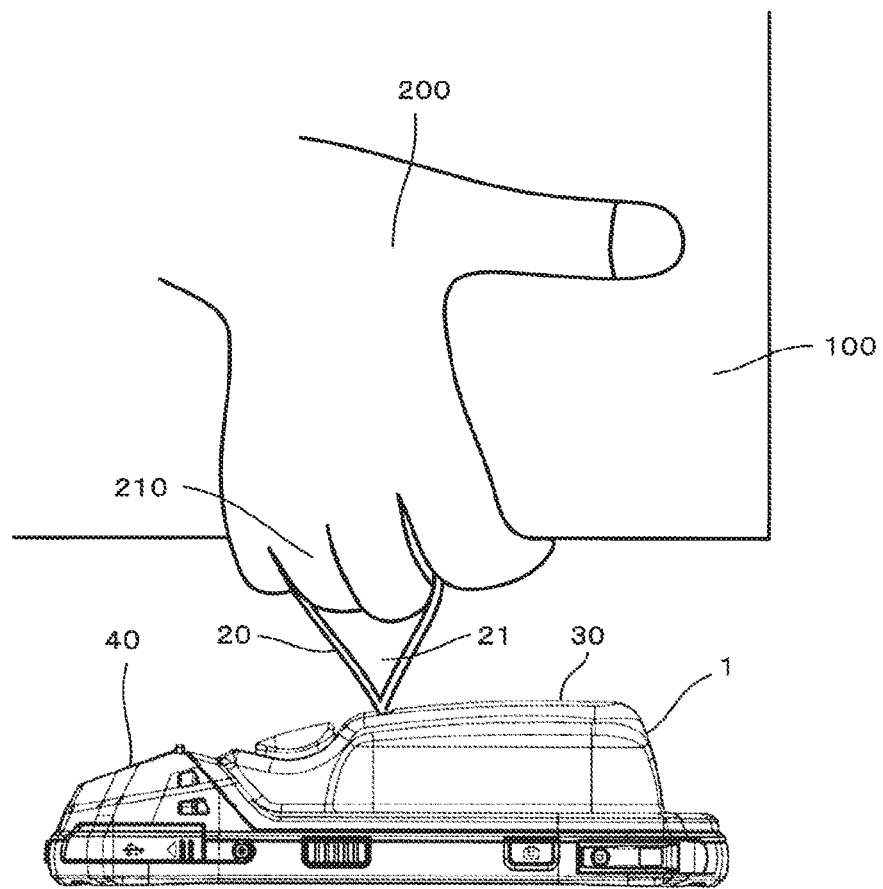
FIG. 2 is a schematic view showing a condition where the operator carries a package while holding the electronic device of the present disclosure.

FIG. 2 shows a condition where the operator carries the package 100 while holding the electronic device 1. A plurality of fingers of the operator are inserted in the open surface 21 of the strap 20, and the operator can carry the package 100 with his/her palm and other fingers while hanging the electronic device 1. While the package 100 is being carried, since the strap 20 is attached to the neighborhood of the gravity center of the electronic device 1, the electronic device 1 stably maintains a predetermined position and the package 100 is not largely shaken by the electronic device 1.

Figure 3:
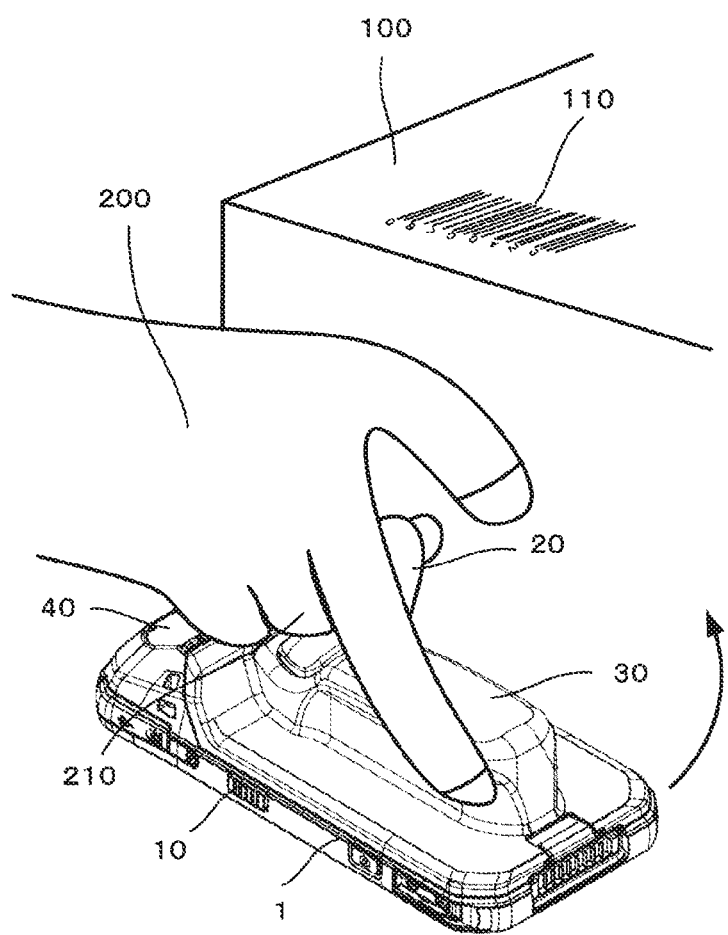
FIG. 3 is a schematic view showing that the operator puts down the package and starts to rotate the electronic device by using a strap of the present disclosure in order to read the bar code.

FIG. 3 shows that the operator puts down the package 100 and starts to rotate the electronic device 1 by using the strap 20 in order to read the bar code 110 pasted to the package 100. The forefinger or the middle finger is inserted from the open surface 21 of the strap 20, the obverse side of the inserted finger and the inner surface of the strap 20 are made to abut on each other and the electronic device 1 is rotated about the abutment position (for the rotation direction, see the direction of the arrow in the figure).

Since the strap 20 is attached to the neighborhood of the gravity center including the gravity center of the electronic device 1, making this the center of rotation produces a centrifugal force, which facilitates the rotation of the electronic device 1. Moreover, since the open surface 21 is formed in the direction substantially orthogonal to the back surface 13, the electronic device 1 can be rotated with the finger inserted in the width direction of the electronic device 1. When this is done, the centrifugal force is easily produced by rotating the electronic device 1 with the length direction thereof as the vertical direction, so that the rotation operation is facilitated.

For example, the strap 20 has a belt-like form with a width that enables stable rotation with fingers. Moreover, it is not necessary for the strap 20 to have both ends thereof attached to one position of the protruding portion 30 as in the present embodiment and the ends may be attached at a slight distance away from each other.

Figure 4:
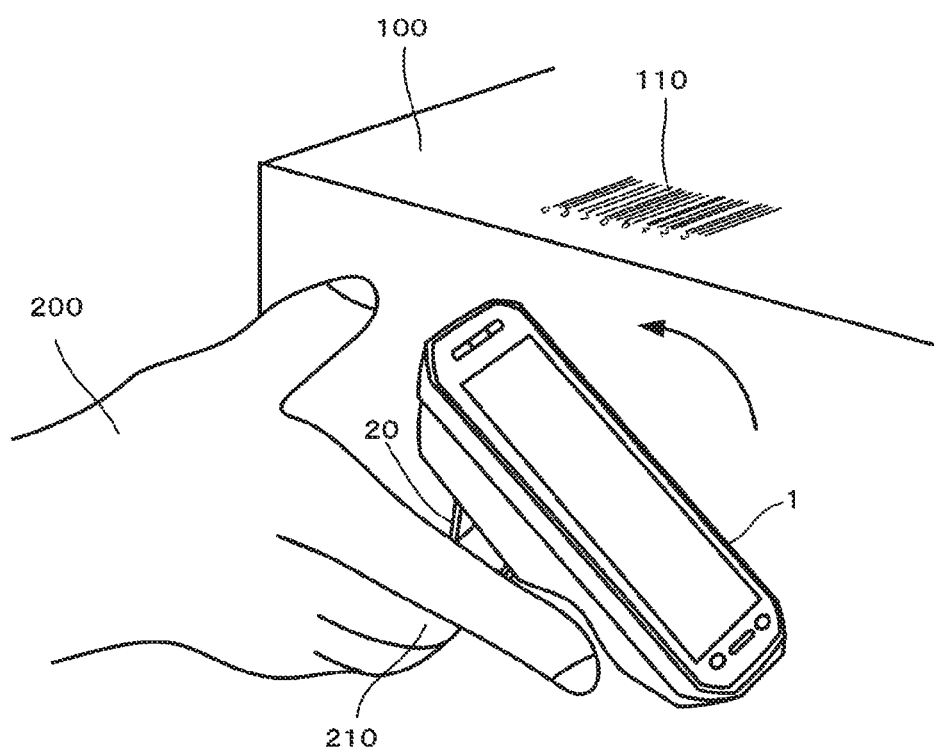
FIG. 4 is a schematic view showing a condition where the electronic device of the present disclosure is further rotated subsequently to FIG. 3.

FIG. 4 shows a condition where the electronic device 1 is further rotated. The electronic device 1 is further rotated so that the back surface 13 of the electronic device body 10 is rotated toward the palm.

Figure 5:
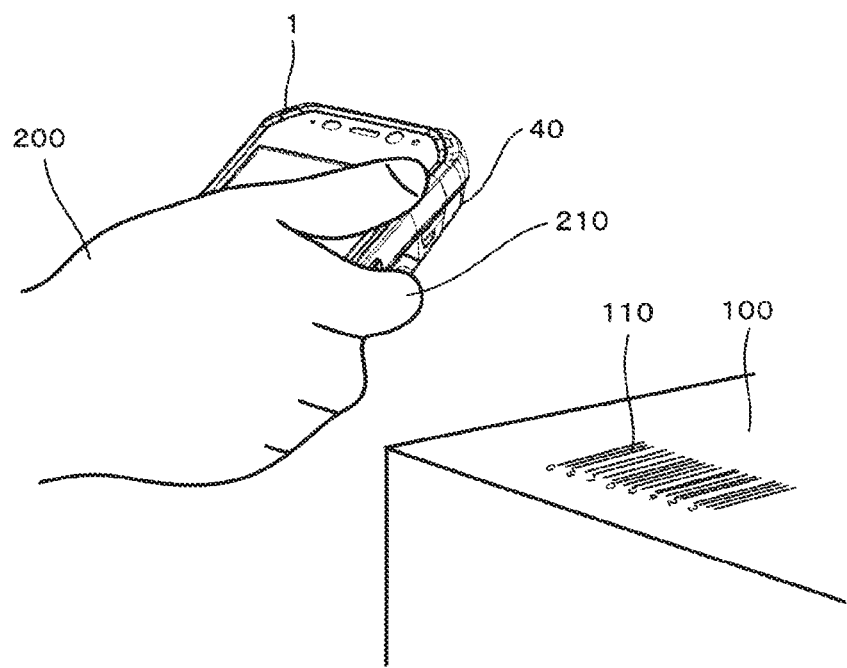
FIG. 5 is a schematic view showing the operator's action of reading the bar code with the electronic device of the present disclosure.

FIG. 5 shows an action of reading the bar code 110. The bar code 110 of the package 100 is read with the bar code reader 40 while the back surface 13 of the rotated electronic device 1 is held on the palm. The switch 41 of the bar code reader 40 can be easily pushed with the forefinger or the like since it is disposed so as to lie over both side surfaces and upper surface of the protruding portion 30. Moreover, the switch 41 can handle both when the operator's dominant hand is the right hand and when it is the left hand since the depression 50 recessed toward the front surface of the electronic device body 10 of the protruding portion 30 is provided. And it is enabled to turn on and off with fingers of either the right or left hand with one switch 41 without the provision of two switches 41.

When the switch 41 is turned on with the bar code reader 40 pointed at the bar code 110, a photo light close to the bar code reader 40 is turned on, so that the bar code 110 can be accurately read.

When the operator of the electronic device 1 of the present disclosure carries another package and reads the bar code 110 again, by rotating the electronic device 1 with the finger inserted in the strap 20 as the axis to return the electronic device 1 onto the palm, reading of the bar code 110 can be started again. Since the electronic device 1 of the present disclosure enables the package 100 to be carried with the electronic device 1 being held with fingers and the bar code 110 pasted to the package 100 can be read by rotating the electronic device 1 with fingers, reduction in work efficiency can be prevented.

For example, the open surface 21 of the strap 20 has a size where at least four fingers aligned in a straight line can be inserted. Moreover, for example, the strap 20 folded in two to have a length of substantially 6 to 10 cm.

When the length is 6 cm or more, since the centrifugal force is strong, the electronic device 1 is easily rotated with a strong rotation force about the gravity center, and when the length is 10 cm or less, the electronic device 1 is easily accommodated in the hand at the completion of the rotation. Moreover, to rotate the electronic device 1 to return it onto the palm, it is necessary to cause a certain degree of centrifugal force on the electronic device 1, and to do so, the strap 20 folded in two is required to have a certain degree of length (corresponding to the radius when the centrifugal force is calculated). While the longer the distance to the electronic device body 10 is, the stronger the centrifugal force is if the rotation speed is not changed, the distance from the electronic device body 10 to the palm becomes large accordingly and this makes it difficult to smoothly return the electronic device 1 onto the palm; therefore, for example, the length of the strap 20 is substantially 6 to 10 cm.

Moreover, when the protruding portion 30 is low in height, for example, the length of the strap 20 is substantially 8 to 12 cm. It is necessary to cause a certain degree of centrifugal force on the electronic device 1, and a predetermined distance can be maintained between the fingers inserted in the open surface 21 and the electronic device body 10.

From the above, the electronic device 1 of the present embodiment is provided with: the electronic device body 10 having, on the back surface 13, the protruding portion protruding in the direction of the thickness; and the belt-like strap 20 attached in a position on the protruding portion 30 and in the neighborhood of the gravity center of the electronic device body 10, the protruding portion 30 is formed on the back surface 13 so as to extend in the direction of the length of the electronic device body 10, the strap 20 demarcates the closed open surface 21 defined in the direction of the length of the electronic device body 10 and in the direction substantially orthogonal to the back surface 13, and the open surface 21 has the area where a plurality of fingers of the operator are insertable.

Consequently, since the space where a plurality of fingers other than the thumb are insertable is defined in the open surface 21 of the strap 20, the electronic device 1 can be grasped with the fingers and the palm and is stabilized in the hand, so that the operation of the display portion 12 such as a touch panel can be easily performed with the thumb. Moreover, since the protruding portion 30 is formed on the back surface so as to extend in the direction of the length of the electronic device body 10, when the operator holds the electronic device 1 on his/her palm, it is easy to freely move the thumb by placing finger tips on the protruding portion, so that the display portion 12 is easily operated with one hand even if the electronic device 1 is increased in size.

Since the strap 20 is attached to the neighborhood of the gravity center of the electronic device body 10, even if the package 100 is carried with fingers being inserted in the strap 20, the electronic device 1 is stabilized and the electronic device 1 is easily rotated with the attachment position as the center of rotation. In particular, since the open surface 21 is formed in the direction orthogonal to the back surface 13, the electronic device 1 can be rotated with fingers being inserted in the direction of the thickness, and the centrifugal force is easily produced by rotating the electronic device 1 with the direction of the length thereof as the vertical direction, so that the rotation operation is facilitated.

From the above, in the electronic device 1 of the present embodiment, the strap folded in two has a length of substantially 6 to 10 cm. Consequently, when the length is 6 cm or more, since the centrifugal force is strong, the electronic device 1 is easily rotated with a strong rotation force with the gravity center as the center, and when the length is 10 cm or less, the electronic device 1 is easily accommodated in the hand at the completion of the rotation.

From the above, the electronic device 1 of the present embodiment has the bar code reader 40 of the electronic device body 10, and in a position between the attachment position of the strap 20 and the bar code reader 40 on the protruding portion 30, the switch 41 of the bar code reader 40 is provided that is disposed so as to lie over both side surfaces and upper surface of the protruding portion 30. Consequently, the switch 41 is easily operated with either the right or the left hand.

From the above, in the electronic device 1 of the present embodiment, the protruding portion 30 is provided with the depression 50 recessed toward the electronic device body 10, and the switch 41 is provided on the depression 50. Consequently, the switch 41 has a proper height on the back surface 13 to improve operability.

From the above, the electronic device 1 of the present embodiment is provided with: the electronic device body 10; and the belt-like strap 20 attached in a position on the back surface 13 of the electronic device body 10 and in the neighborhood of the gravity center of the electronic device body 10, the strap 20 demarcates the closed open surface 21 defined in the direction of the length of the electronic device body 10 and in the direction substantially orthogonal to the back surface 13, the open surface 21 has an area where a plurality of fingers of the operator are insertable, and the strap 20 folded in two has a length of substantially 8 to 12 cm.

Consequently, since the fingers and the length of the electronic device 1 can be maintained even if the protruding portion 30 is low in height, the centrifugal force is easily produced, so that the electronic device 1 can be easily rotated.

While an embodiment of the electronic device according to the present disclosure has been described above with reference to the drawings, the present disclosure is not limited to such an example. It is obvious that one of ordinary skill in the art can arrive at various change examples, modification examples, replacement examples, addition examples, deletion examples and equivalent examples within the scope recited in the claims, and it is to be understood that these also belong to the technical scope of the present disclosure.

The electronic device of the present disclosure is useful in the field where it is desired that bar code reading can be performed without the electronic device being detached from the hand while the package is being carried.

What is claimed is:

1. An electronic device comprising:
   an electronic device body; and
   a strap attached to the electronic device body,
   wherein a protruding portion protruding in a direction of thickness of the electronic device body is provided on a back surface of the electronic device body;
   wherein the protruding portion has a major dimension extending in a longitudinal direction of the electronic device body;
   wherein the strap has a belt-like folded configuration with a folded region provided between two strap portions and ends of the two strap portions are attached on a top surface of the protruding portion at a position in a vicinity of a center of gravity of the electronic device body, such that the strap extends from the top surface in a direction away from the top surface; and
   wherein the folded configuration of the strap defines a through hole having a size such that a plurality of fingers of an operator are insertable into the through hole.

2. The electronic device according to claim 1, wherein the strap folded in two has a length of substantially 6 to 10 cm.

3. The electronic device according to claim 1, wherein the electronic device body has a bar code reader; and
   wherein a switch of the bar code reader disposed so as to lie over both side surfaces and an upper surface of the protruding portion is provided in a position between an attachment position of the strap and the bar code reader on the protruding portion.

4. The electronic device according to claim 3, wherein the protruding portion is provided with a depression recessed toward a front surface of the electronic device body which is opposite to the back surface; and
   wherein the switch is provided on the depression.

5. The electronic device according to claim 1, wherein the strap is pivotable about an axis extending in a width direction of the electronic device body, which is perpendicular to the longitudinal direction and the thickness direction of the electronic device body.

6. The electronic device according to claim 1, wherein the ends of the two strap portions are attached on a same position on the top surface of the protruding portion.

7. An electronic device comprising:
   an electronic device body; and
   a strap attached to the electronic device body,
   wherein the strap has a belt-like folded configuration with a folded region provided between two strap portions and ends of the two strap portions are attached on a back surface of the electronic device body at a position in a vicinity of a center of gravity of the electronic device body, such that the entire strap is positioned above the back surface of the electronic device body;
   wherein the folded configuration of the strap defines a through hole having a size such that a plurality of fingers of an operator are insertable into the through hole; and
   wherein the strap is pivotable about an axis extending in a width direction of the electronic device body, which is perpendicular to the longitudinal direction and the thickness direction of the electronic device body.

8. The electronic device according to claim 7, wherein the ends of the two strap portions are attached on a same position on the back surface of the electronic device body.

9. The electronic device according to claim 7, wherein the strap folded in two strap portions has a length of substantially 8 to 12 cm.

* * * * *